United States Patent [19]

Zimmer

[11] Patent Number: 4,986,463
[45] Date of Patent: Jan. 22, 1991

[54] FLUX EFFECT BY MICROEXPLOSIVE EVAPORATION

[75] Inventor: Gero Zimmer, Rolling Hills Estates, Calif.

[73] Assignee: Productech Inc., Rolling Hills Estates, Calif.

[21] Appl. No.: 382,849

[22] Filed: Jul. 20, 1989

[30] Foreign Application Priority Data

Jul. 21, 1988 [DE] Fed. Rep. of Germany ....... 3824861

[51] Int. Cl.$^5$ .............................................. B23K 1/20
[52] U.S. Cl. ................................... 228/205; 228/223;
148/23; 156/629; 156/642; 156/664; 156/666; 156/667
[58] Field of Search ................. 228/205, 207, 223, 57; 148/23; 156/625, 629, 642, 664, 666, 667

[56] References Cited

U.S. PATENT DOCUMENTS

| | | | |
|---|---|---|---|
| 2,291,399 | 7/1942 | Miller | 228/223 |
| 4,244,506 | 1/1981 | Stokes, Jr. et al. | 228/223 |
| 4,738,732 | 4/1988 | Anderson et al. | 148/23 |

FOREIGN PATENT DOCUMENTS

| | | | |
|---|---|---|---|
| 79173 | 5/1982 | Japan | 156/667 |
| 433000 | 11/1974 | U.S.S.R. | 148/23 |
| 599805 | 3/1948 | United Kingdom | 148/23 |

OTHER PUBLICATIONS

IBM Technical Disclosure, "Immersion Wave Soldering Flux", vol. 29, No. 7, p. 3178, 12-1986.

Primary Examiner—Sam Heinrich
Attorney, Agent, or Firm—Notaro & Michalos

[57] ABSTRACT

A process for joining the surface of one preferably metallic member to another at a joint, and using solder to create the joint at a joining temperature, includes applying a medium to the joint which evaporates by microexplosion at below the joining temperature. The microexplosive evaporation of the medium advantageously cleans the surfaces of the members and reduces surface tension to allow solder to flow and wet the surfaces. The medium is advantageously glycerin or a mixture of glycerin and detergent so that no residue remains after the joining operation.

19 Claims, 3 Drawing Sheets

FLUX EFFECT BY MICROEXPLOSIVE EVAPORATION

FIELD AND BACKGROUND OF THE INVENTION

The present invention relates in general to the joining of members using heat in a soldering, brazing or welding operation, and in particular to a new and useful process which utilizes a medium that undergoes evaporation by microexplosions at or below the joining temperature for cleaning, protecting and reducing surface tension at the surfaces of members to be joined to each other Heat can be used to join members to each other whether they are of metallic or non-metallic materials. The process of soldering includes a third material which has a lower melting temperature than that of either of the members to be connected to each other. The solder creates an intermetallic alloy with the base materials to mechanically connect them to each other Without the formation of these alloys, the solder simply lies on the surface between the members Soldering is generally divided into soft soldering which takes place at up to 300° C. and usually involves solders made of tin and lead. Hard soldering which is also known as brazing uses temperatures above 400° C. Solders for brazing are usually alloys of copper, silver or gold.

Welding is a joining operation which does not use a third solder material but which relies on the fusing of the members at their surfaces for connecting the members together.

Flux is commonly used for all types of thermal joining. Fluxes commonly have a solid base such as resin which is in a liquid solvent so that the flux can be sprayed or brushed onto the surfaces to be joined. The solvent evaporates at the beginning of the soldering cycle leaving only the solid flux at the joint surfaces. The flux usually fuses before reaching the joining or soldering temperatures and is at this point active for cleaning and protecting the surfaces to be joined.

The flux thus satisfies two important requirements for an effective joining. The first of these is that the surfaces to be joined are free of any contaminants such as grease, dirt or oxide. The second is that once cleaned, the surfaces must remain clean throughout the joining operation.

Even if the surfaces are cleaned by mechanical means such as scraping or machining, the heating of the joint produces new oxides and other contaminants which must be controlled. The cleaning and maintenance of clean conditions at the surfaces are required to reduce surface tension. High surface tension prevents the smooth wetting and flowing of the fused materials at the joint, whether they are the surface portion of the members to be joined together or a solder. Without an effective wetting, a solder or weld joint will not be created.

Flux is thus needed for most thermal joining operations.

During the fusing process, the flux tends to stay at the surfaces of the solder and the members to be joined. Some of the flux may invade the body of the solder, however. Some enclosure are even present after the end of the solder process. Any flux which remains around the joint must be removed either by mechanical or chemical means to avoid any subsequent solder activity even at ambient temperatures. The cleaning process is critical and expensive. Despite this, however, flux may remain within the cavities in the joint which results in the creation of unwanted holes an channels. These reduce mechanical strength. In addition, since fluxes are chemically agressive, these may act as a sight for corrosion and water absorption.

SUMMARY OF THE INVENTION

The object of the present invention is to produce a flux effect during a thermal joining process which leaves no solid residues but which is still effective in cleaning and maintaining clean conditions in the joint area.

The present invention is applicable not only for connecting metallic member to each other either directly by welding or with an intermediate solder, but also for % joining non-metal members together such as plastic to plastic or for joining metal to non-metal members. These include plastic to metal joints such as conductive plastic to metal oxide connections and even gall-solder connections.

The present invention utilizes a mechanical rather than a chemical technique for reducing surface tension at the surfaces to be joined.

According to the present invention, the thermal joining process is envisioned to include a first phase whereby contaminants are reduced at the surfaces of the materials to be joined, and a second stage whereby the surfaces are maintained in a cleaned condition despite the thermal process. The object of the first and second phase is to increase wetability and reduce surface tension at the surfaces to be connected.

The inventor has found that quite surprisingly and unexpectedly, if a medium is used at the joint which evaporates below or near the joining temperature, mechanical microexplosions are created which drastically reduce surface tension and produce an effective weld or solder joint. It appears that the microexplosions produced by sudden evaporation of the medium mechanically disperses contaminants and may mechanically force the solder or fused surface portion of the members to flow, producing sufficient wetting for creating the joint.

Higher alcohols such as glycerin have been found to be particularly effective in practicing the present invention. Glycerin is an inexpensive, widely available substance which leaves no residue after evaporation. Since glycerin is relatively viscous, the inventor has found it useful to add a wetting agent to the glycerin. Household detergents such as liquid dishwashing detergent work well as a wetting agent and additive to the glycerin. Since glycerin is already used for skin treatment, it results in an absolutely clean environment for the thermal joining process. The use of detergent is also advantageous in that selected fragrances can be included in the medium for even further improving environmental conditions. This is in stark contrast to the noxious fumes generated by conventional flux during thermal joining operations.

According to another feature of the invention, a selected amount of medium is used so that by the end of the joining process, all of the medium has evaporated. This eliminates any subsequent cleaning step. Even where excess medium is present, it is easily driven off by further heating even at reduced temperatures. Simply storing the complete joints at ambient or slightly elevated temperatures will eventually remove all of the medium.

The medium will also be removed from any tiny holes or cracks in the joint.

The medium of the present invention both replaces conventional flux and eliminates many of the problems associated with the use of conventional flux.

While the microexplosion mechanism is not fully understood, it is believed that this evaporation by microexplosion of the medium produces craters in the solid and liquid surfaces at the joint which mechanically, and perhaps chemically, breaks up the surfaces and breaks up the oxides to increase flow and wetability and decrease surface tension. The invention thus appears to operate as a mechanical rather than a chemical flux.

Ideally, the flux-like medium of the present invention should have an evaporation temperature which is slightly below or near the joining temperature. While medium having lower evaporation temperatures, such as simple water, can be used, a problem occurs in that as the medium evaporates, it draws excessive heat from the joining area thereby adversely effecting the joining operation. Lower evaporating mediums can be used, however, if efforts are made to maintain the joining temperature, for example, by directing heated gas at the joint.

Another advantage to using a medium which has an evaporation temperature near the joining temperature is that some of the medium will remain at the joining temperature to protect the surface during the phase two portion of the process (that is the phase when new oxides or other contaminants may be created).

The flux-like medium of the present invention may be solid or liquid at ambient temperatures with an evaporation temperature as noted above.

The use of a gas stream in the present invention can also be effective in channeling the solder, fused metal and medium as desired. Advantageously, inert gas such as helium is used to avoid oxidation. Alternatively, gases having a reducing effect can be utilized.

Since the medium of the present invention apparently reduces surface tension and improves wetability, the process of the invention can also be used for removing solder from surfaces for cleaning purposes. It has been found, for example, that by emersing the solder tip of a soldering iron having solder thereon, into a quantity of medium, the tip is cleaned of solder.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
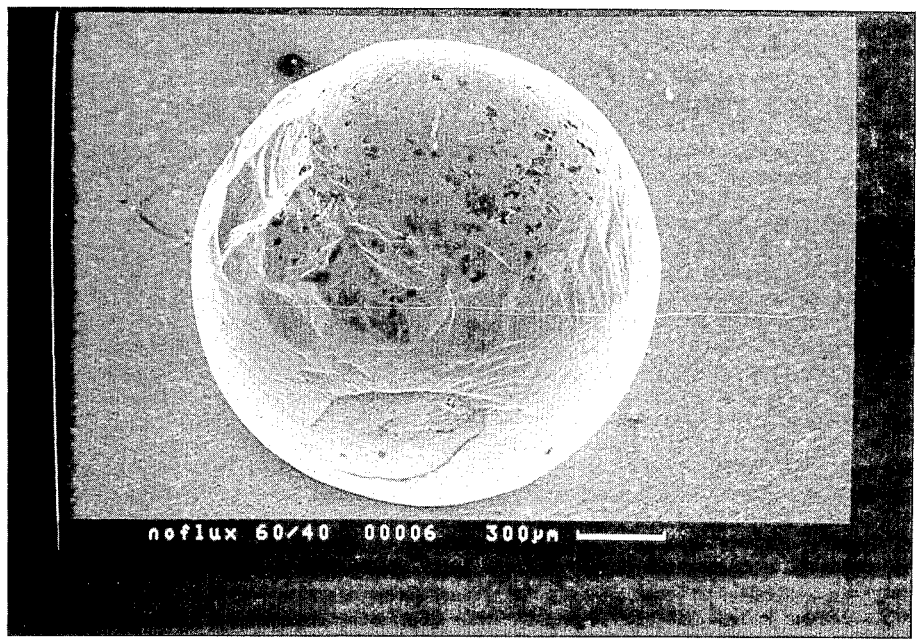
FIG. 1 is a microphotograph showing a control experiment used to verify the usefulness of the present invention.

Referring to the drawings in particular, FIG. 1 is a microphotograph taken from above of a solder ball made of 60/40 solder and having a 1 mm diameter. This ball was placed on a sheet of copper foil having a thickness of 0.2 mm. The foil was heated to 250° C. Heating was conducted in a standard air environment. The heating was constant during the heating stage and no medium was utilized in accordance with the present invention. After 60 seconds of heating the heat was removed and the copper foil and solder ball were allowed to cool. Based on natural thermal expansion and shrinking during the thermal cycle, the ball changed shape slightly from an ideal sphere. Because of extreme high surface tension and the present of heavy oxides, shrinking was not uniform. No wetting took place between the solder and the copper. No joint was created. The oxidized surface had heavy surface tension and wrinkling. In addition, dark spots were observed which represent additional oxide areas.

Figure 2:
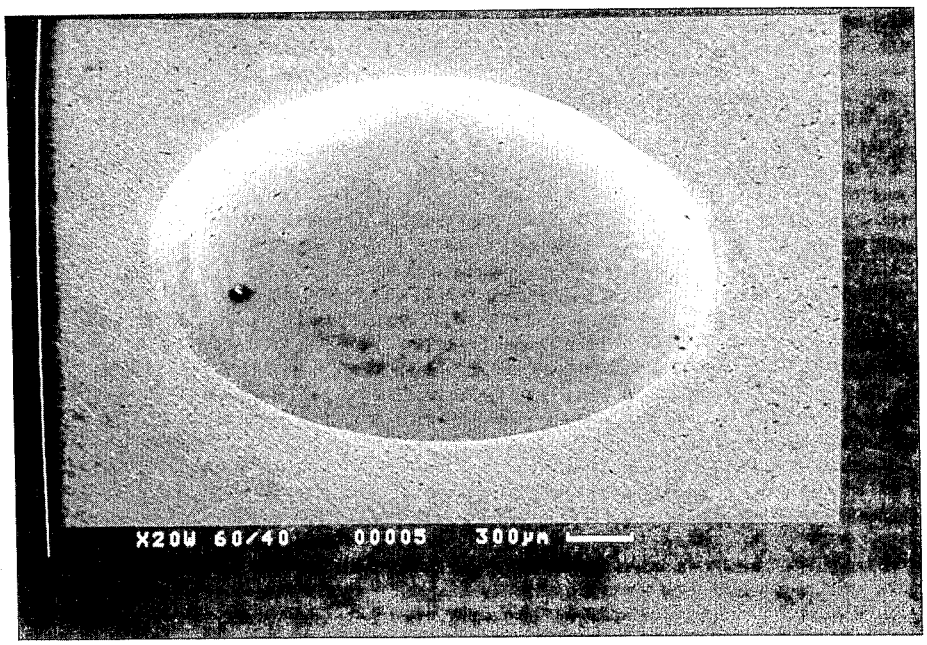
FIG. 2 is a microphotograph showing the results of a joining operation in accordance with the present invention.

In a second experiment having results that are illustrated in FIG. 2, the same conditions as above were observed. After heating the ball and copper foil to 250° C., a few drops of a glycerin plus detergent medium were dropped on the assembly. Some oxide layers were observed before the medium was dropped on the assembly.

The solder ball was observed to lose its surface tension and flow smoothly onto the copper surface. An almost perfect wetting occurred and the shape of the ball changed to a flattened shape evident in FIG. 2. This presented a balance between the internal solder tension and external copper wetting. Heating stopped after about 10 seconds and the sample was allowed to cool. All the medium evaporated and none remained around the joint. No cleaning was performed before taking the photograph of FIG. 2.

Figure 3:
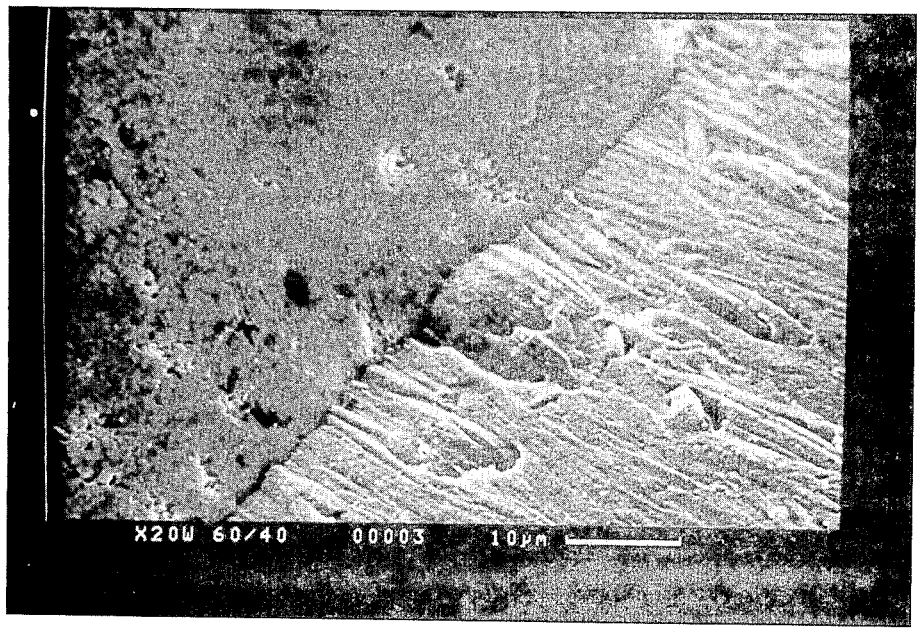
FIG. 3 is a microphotograph of a small peripheral region of FIG. 2 showing the adhesion of a quantity of solder to a sheet of copper foil.

The microphotograph of FIG. 3 shows a peripheral area of the adhered solder ball of FIG. 2, at greatly increased magnification. FIG. 3 illustrates the excellent wetting capacity between the solder and the copper with an almost zero radius at the solder-copper interface. Because all of the medium evaporated during the thermal process and before the sample was cooled, the solder surface, after it had flowed to its position shown in FIGS. 2 and 3, showed slight oxidation. This had no adverse effect on the joint, however, since oxidation apparently took effect after the flowing and wetting of the solder on the copper.

Figure 4:
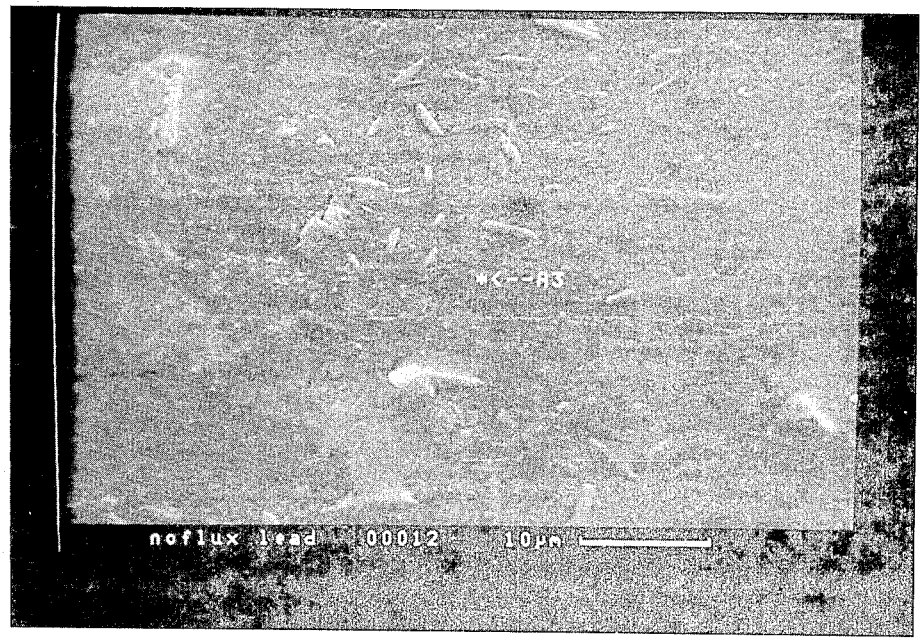
FIG. 4 is a microphotograph showing the lead of an intergrated circuit which was stored for a long period of time and which has an imperfect solder plating thereon.
Figure 5:
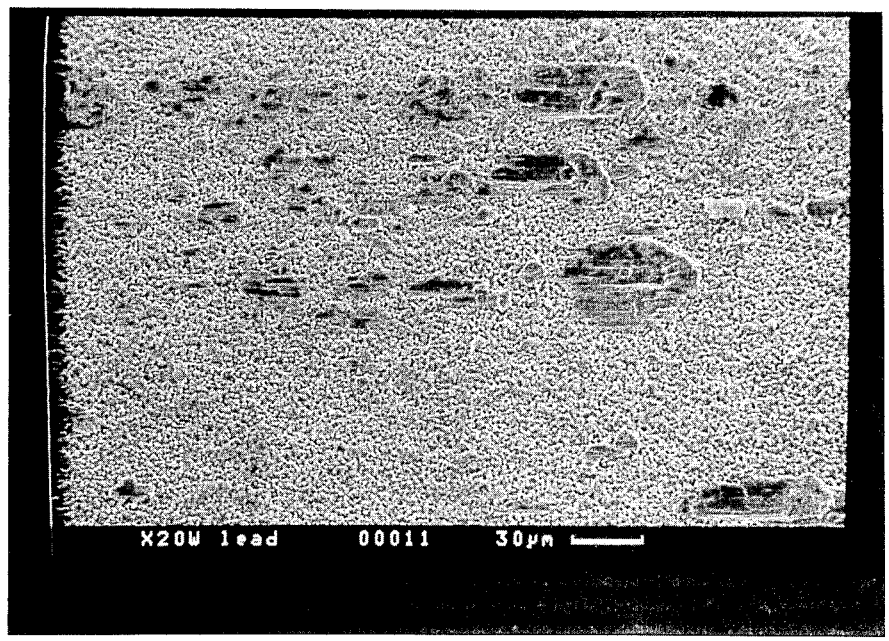
FIG. 5 is a microphotograph showing the same lead after it was subjected to the process of the present invention.

Another experiment which was conducted to verify the usefulness of the present invention is illustrated in FIGS. 4 and 5.

FIG. 4 is an enlarged microphotograph showing the surface of a lead on a typical intergrated circuit. The lead is made of Alloy 42 which is predominently iron. The lead had been electroplated with 90/10 solder to a thickness of about 4 micrometers.

The lead had been stored for five years. During that storage, some iron migrated through pores of the solder plating and covered the outer surface thereof. Absolutely no solder was in fact visible on the surface. "Solderability" according to conventional standards had thus been entirely lost. Note the small crystal needles of pure iron on the surface of the lead.

The lead was heated to 250° C. and the glycerin plus detergent medium of the present invention was dropped on the surface.

FIG. 5 shows the results of the microexplosive evaporation which resulted. Apparently, the surface tension of the solder was reduced sufficiently to allow the remaining solder under the upper iron coating to fuse and float to the surface creating a typical fine solder ball pattern without any oxides at its surface. Excess medium was used so that some of the medium remained unevaporated after the heating cycle. This effectively prevented further oxidation from taking place. The part was cleaned and washed before the photograph of FIG. 5 was taken.

Since the microexplosive evaporation is responsible for the reduced surface tension and increased wetting and flowability of the solder, any medium which may be liquid or solid at ambient room temperature and which evaporates at below the joining temperature can be used for the present invention. It is particularly advantageous to utilize medium which leaves no residue after evaporation to avoid having to clean the solder or weld joint. Inert or reducing gases are also useful when applied by nozzles in a stream directed toward the joint area for directing the medium and fused solder and for producing an improved environment for the thermal treatment. The gas may be heated to maintain the joint at the joining temperature particularly where mediums having low evaporation temperatures (e.g. water) are to be used. The guided gas can also be used to remove surplus material or solder during or after the joining cycle by means of relocation or evaporation. After such process, a typical cleaning cycle can be utilized which can be combined with a cooling cycle.

To reduce excess medium, only enough medium is applied to the joint so that it is all evaporated by the end of the joining cycle.

The reduced need for cleaning increases throughput time for the creation of soldered joints. If excess medium is used, the flow of gas can be effective in blowing off or evaporating excess medium.

A pulsed heating method can also be used to practice the invention. The microexplosive evaporation is still effective during pulse heating to clean and protect the surface for producing an effective weld or solder connection.

Another feature of the present invention is the use of a closed environment for the joining process. In such a closed environment the evaporated medium is collected, condensed and then used for subsequent joining cycles. Since the medium is non-corrosive and environmentally safe, there is little environmental danger and little danger of corrosion to the hardware for recycling the medium. The medium can also be deposited in the desired shape for the joint. With the solder and medium both deposited in that shape, a reduced flowing of the solder and medium is needed to establish the joint during the thermal treatment. The liquid medium in this environment also acts as a thermal conductor for conducting heat from the members to be joined, to the solder. This is particularly useful if the members have an irregular shape and do not initially conform to the shape of the solder. In this way, non-flat surfaces can be soldered through the help of the liquid medium acting as a thermal conductor. As soon as this solder melts, the solder itself acts as a thermal conductor and the medium can evaporate through microexplosion to produce the flux effect.

It is also advantageous to conduct the entire cycle using a selected temperature profile which controls the temperature through different times of the cycle. This assures controlled temperature rates and takes full effect of pulse solder technology which supplies thermal energy based on a controlled thermal contact by force from a pulse heated soldering tool to the members that are to be joined.

The present invention is not limited to soldered joints but may also be used to plate a surface with solder or to remove solder from that surface. The flux effect of the present invention can also be used for metallic and non-metallic welding operations.

As noted above, the technique of the invention can also be used for cleaning the solder itself. Using the invention the surface of the solder is cleansed and is rendered free of any extraneous contaminants. The solder can then be stored in a closed environment to avoid subsequent contamination.

While a specific embodiment of the invention has been shown and described in detail to illustrate the application of the principles of the invention, it will be understood that the invention may be embodied otherwise without departing from such principles.

What is claimed is:

1. A process for joining the surface of one member to the surface of another member at a joint, using heating to a joining temperature comprising:
    applying a medium to the surface of at least one member at the joint, the medium evaporating by microexplosion at a temperature below the joining temperature and leaving substantially no solids, the medium being solid or liquid at ambient temperatures; and
    heating the joint to the joining temperature to evaporate the medium by microexplosion for cleaning the surfaces and reducing surface tension thereat to form the joint.

2. A process according to claim 1 including applying solder to the surface of at least one joint which has a melting temperature at the joining temperature and below the melting temperature of the members.

3. A process according to claim 1 wherein the medium evaporates at slightly below the joining temperature.

4. A process according to claim 1 including adding a wetting agent to the medium.

5. A process according to claim 4 wherein the wetting agent is detergent.

6. A process according to claim 5 wherein the medium is glycerin.

7. A process according to claim 1 including applying a selected amount of medium to the surface which completely evaporates when the joint is formed.

8. A process according to claim 1 wherein the medium is selected from the group consisting of higher alcohols.

9. A process according to claim 8 wherein the medium comprises glycerin.

10. A process according to claim 1 including supplying a gas to the joint.

11. A process according to claim 10 wherein the gas is inert.

12. A process according to claim 11 wherein the gas is heated to about the joining temperature for maintaining heat at the joint.

13. A process according to claim 1 including applying solder to the surface of at least one member and applying sufficient medium to bridge any space between the solder an the surface of the one member for acting as a thermal conductor between the member and the solder.

14. A process according to claim 1 including collecting the evaporated medium, condensing the collected evaporated medium and reusing the medium in a subsequent joining operation.

15. A process according to claim 14 including conducting the process in a closed environment.

16. A process for applying and removing solder to a surface comprising:
   heating the surface to the fusing temperature of the solder; and
   adding a medium to the surface which evaporates by microexplosion at below the fusing temperature of the solder.

17. A process according to claim 16 wherein the medium includes glycerin.

18. A process according to claim 17 wherein the medium includes a mixture of glycerin and wetting agent.

19. A process according to claim 18 wherein the wetting agent comprises a detergent.

* * * * *